US008887970B2

(12) United States Patent
Tsai et al.

(10) Patent No.: US 8,887,970 B2
(45) Date of Patent: Nov. 18, 2014

(54) PORTABLE ELECTRONIC MODULE HAVING A HOLDER

(75) Inventors: Stephen Tsai, New Taipei (TW); Mei-Ching Tsai, Taipei (TW); Shao-Yu Hwang, Taipei (TW)

(73) Assignee: Hannspree, Inc., New Taipei (TW)

( * ) Notice: Subject to any disclaimer, the term of this patent is extended or adjusted under 35 U.S.C. 154(b) by 495 days.

(21) Appl. No.: 13/427,661

(22) Filed: Mar. 22, 2012

(65) Prior Publication Data

US 2013/0114232 A1 May 9, 2013

(30) Foreign Application Priority Data

Nov. 3, 2011 (TW) .............................. 100140180 A

(51) Int. Cl.
 A45F 5/00 (2006.01)
 G06F 1/16 (2006.01)
(52) U.S. Cl.
 CPC ............. *G06F 1/1626* (2013.01); *G06F 1/163* (2013.01); *Y10S 224/93* (2013.01)
 USPC ........... 224/217; 224/218; 224/267; 224/271; 224/930; 361/679.03; 455/575.6
(58) Field of Classification Search
 USPC .............. 63/15, 15.2; 206/320; 224/191, 195, 224/217, 218, 267, 270–272, 929, 930; 361/679.01, 679.02, 679.03, 679.55, 361/679.56, 807, 809; 455/575.1, 575.6, 455/575.8
 See application file for complete search history.

(56) References Cited

U.S. PATENT DOCUMENTS

| | | | | |
|---|---|---|---|---|
| 8,550,317 B2 * | 10/2013 | Hyseni | .......................... | 224/217 |
| 8,672,374 B1 * | 3/2014 | Webber | .......................... | 224/217 |
| 8,746,448 B1 * | 6/2014 | Bellace | .......................... | 206/320 |
| 8,833,820 B1 * | 9/2014 | Hill | .............................. | 224/218 |
| 2009/0219677 A1 * | 9/2009 | Mori et al. | ................. | 361/679.03 |
| 2010/0222118 A1 * | 9/2010 | Interdanato | ................. | 455/575.6 |
| 2011/0011906 A1 * | 1/2011 | Musgrave | ..................... | 224/269 |
| 2011/0266316 A1 * | 11/2011 | Ghalib et al. | ................. | 224/217 |
| 2011/0303709 A1 * | 12/2011 | Wizikowski | .................. | 224/218 |
| 2012/0011888 A1 * | 1/2012 | Patterson | ......................... | 63/15 |
| 2012/0031937 A1 * | 2/2012 | Baker | ............................ | 224/217 |
| 2012/0063066 A1 * | 3/2012 | Floit | ............................. | 224/218 |
| 2014/0084034 A1 * | 3/2014 | Wangercyn et al. | .......... | 224/217 |

\* cited by examiner

*Primary Examiner* — Luan K Bui
(74) *Attorney, Agent, or Firm* — Ming Chow; Sinorica, LLP

(57) ABSTRACT

A portable electronic module including a portable electronic device and a holder applied to hold the portable electronic device is provided. The portable electronic device includes a first surface, a second surface opposite to the first surface, and a display unit disposed on the first surface, wherein a connecting unit is disposed on the second surface. The holder includes a first body having a first connecting portion and a first wearing portion and a second body having a second connecting portion suited to connect with the first connecting portion and a second wearing portion, wherein the first body is suitable to connect with the second body. At least one of the first connecting portion and the second connecting portion is suitable for connecting with the connecting unit, and a wearing space is formed to wear for users by the combination of the first wearing portion and the second wearing portion.

12 Claims, 21 Drawing Sheets

PORTABLE ELECTRONIC MODULE HAVING A HOLDER

The current application claims a foreign priority to a patent application in Taiwan with a serial number 100140180 filed on Nov. 11, 2011.

BACKGROUND OF THE INVENTION

1. Field of the Invention

The invention relates to a portable electronic module. More particularly, the invention relates to a portable electronic device having a holder.

2. Description of Related Art

Recently, with continuous evolution of information technology, the portable electronic device is rapidly developed, especially tablet PC and smart phone. As a user can operate a tablet PC directly through a touch screen disposed in the tablet PC. The tablet PC has the advantages of thin and easy to carry characteristic, therefore, the tablet PC has gradually become more and more popular.

Worth mentioning is that the tablet PC's size is usually larger than the palm of user. Therefore, the user won't be able to hold the tablet PC, like holding a phone stably. Often the user needs to hold the side or back of the tablet PC by two hands to have a steady grip. However, normally when the user operates the tablet PC only one hand is holding the tablet PC and the other hand operate the touch screen. The tablet PC can easily fall or dropped by accident, and it will damage the tablet PC if the user hasn't have a firm grip on the tablet PC.

SUMMARY OF THE INVENTION

The invention is directed to a portable electronic device in which a holder can hold the portable electronic device firmly.

In the invention, a portable electronic module is provided. The portable electronic module includes a portable electronic device and a holder applied to hold the portable electronic device. The portable electronic device includes a first surface, a second surface opposite to the first surface, and a display unit disposed on the first surface, wherein a connecting unit is disposed on the second surface. The holder includes a first body having a first connecting portion and a first wearing portion and a second body having a second connecting portion suited to connect with the first connecting portion and a second wearing portion, wherein the first connecting portion has a first connecting surface and a third connecting surface, and the second connecting portion has a second connecting surface and a fourth connecting surface. In addition, the first body is suitable to connect with the second body. At least one of the first connecting portion and the second connecting portion is suitable for connecting with the connecting unit, and a wearing space is formed to wear for a user by the combination of the first wearing portion and the second wearing portion.

In one embodiment of the present invention, the first connecting portion and the second connecting portion are magnetism.

In one embodiment of the present invention, the first connecting surface, the second connecting surface, the third connecting surface and the fourth connecting surface are magnetism.

In one embodiment of the present invention, the first connecting surface is a top surface of the first connecting portion, the third connecting surface is corresponding to the first connecting surface, and is a bottom surface of the first connecting portion, the second connecting surface is a top surface of the second connecting portion, the fourth connecting surface is corresponding to the second connecting surface, and is a bottom surface of the second connecting portion, and the second connecting surface and the third connecting surface are coplanar.

In one embodiment of the present invention, further comprises a wire-winding unit with a connecting wire, the first connecting portion has a first accommodating space, the second connecting portion has a second accommodating space, the third connecting surface has a first opening, the fourth connecting surface has a second opening, wherein the wire-winding unit is disposed in at least one of the first accommodating space and the second accommodating space, and the connecting wire of the wire-winding unit is connected to the other of the first accommodating space and the second accommodating space through the first opening or the second opening, when the first connecting portion is not connected with the second connecting portion, a portion of the connecting wire is exposed out of the first connecting portion and the second connecting portion.

In one embodiment of the present invention, the first wearing portion is extended from the bottom of the first connecting portion, the second wearing portion is extended from the bottom of second wearing portion, and the first wearing portion has a first through hole and a fifth connecting surface, the second wearing portion has a second through hole and a sixth connecting surface, when the first body and the second body is connected with each other, the fifth connecting surface is connected with the sixth connecting surface, the first through hole and the second through hole are intercommunicated with each other to form the wearing space.

In one embodiment of the present invention, the first wearing portion has a first outside surface, the second wearing portion has a second outside surface, the first outside surface and the fifth connecting surface are connected with each other, the second outside surface and the sixth connecting surface are connected with each other, and the first outside surface and the second outside surface are curved surfaces.

In one embodiment of the present invention, there are multiple first sections and second sections, the first sections are arranged in the first outside surface adjacent to the fifth connecting surface, the second sections are arranged in the second outside surface adjacent to the sixth connecting surface, when the first body and the second body are connected with each other, each first section and each second section corresponding to the first section are connected with each other.

In one embodiment of the present invention, there are multiple first protrusions and second protrusions, the first protrusions are arranged in the first outside surface, and the second protrusions are arranged in the second outside surface, when the first body and the second body are connected with each other, each first protrusion and each second protrusion corresponding to the first section are connected with each other.

In one embodiment of the present invention, the second body is connected to two sides of the first body, the first connecting portion is disposed on the outside surface of the first body, the first wearing portion is disposed on the inside surface of the first body, the second connecting portion is disposed on outside surface of the second body, the second wearing portion is disposed on the inside surface of the second body, and the portable electronic device is disposed in the first connecting portion, a ring-shaped opening region is surrounded by the first wearing portion and the second wearing portion to form the wearing space.

In one embodiment of the present invention, the first connecting portion has a connecting element, the connecting element is suited to connect with the portable electronic device, and the portable electronic device is rotated opposite to the first connecting portion.

In one embodiment of the present invention, there is a guiding slot disposed in a portion of outside surface of the second connecting portion that away the first connecting portion, and the second body further comprises a supporting element, two ends of the supporting element are connected to the guiding slot movably, when the two ends of the supporting element are connected to two ends of the guiding slot, the outside surface of the supporting element and the outside surface of the second connecting portion are coplanar, when at least one end of the supporting element is not connected to the end portion of the guiding slot, the outside surface of the supporting element is protruded out of the outside surface of the second connecting portion.

As described in the embodiments of the invention, the holder can hold the portable electronic device by the combination of the first body and second body, and the wearing space is formed to wear for a user by the combination of the first wearing portion and the second wearing portion. As such, when the user applies one hand to touch the touch screen disposed in the portable electronic device, the other hand can hold the portable electronic device stably by the holder, and then avoids the portable electronic device falling for a reason that a fuselage of the portable electronic device is not easy to hold.

Other features and advantages of the invention will be further understood from the further technological features disclosed by the embodiments of the invention wherein there are shown and described embodiments of this invention, simply by way of illustration of best modes to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Other features and advantages of the invention will be further understood from the further technological features disclosed by the embodiments of the invention wherein there are shown and described embodiments of this invention, simply by way of illustration of best modes to carry out the invention.

Figure 1A:
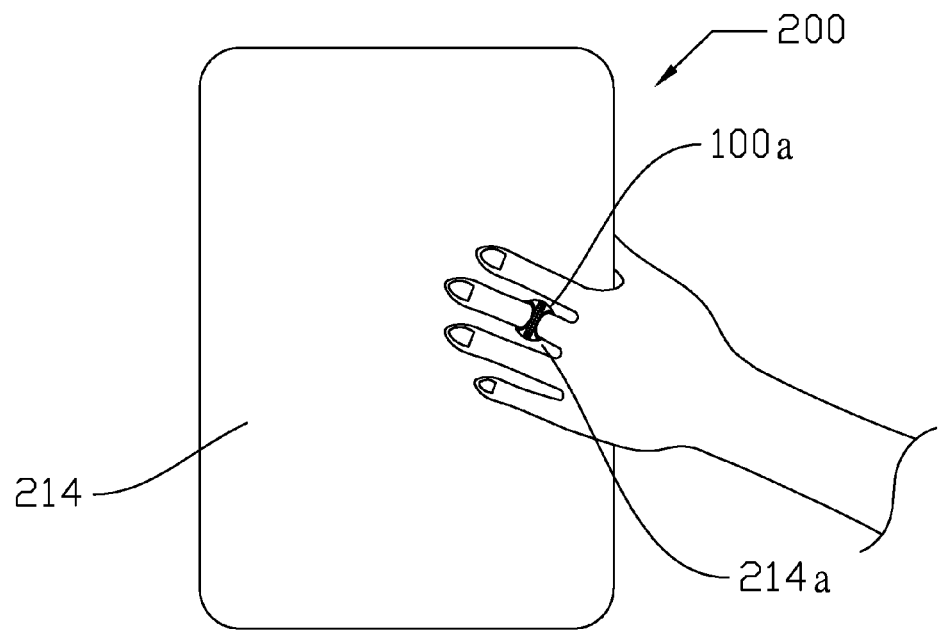
FIG. 1A and FIG. 1B is a schematic view illustrating that a user operates the portable electronic device according to an embodiment of the present invention.
Figure 1B:
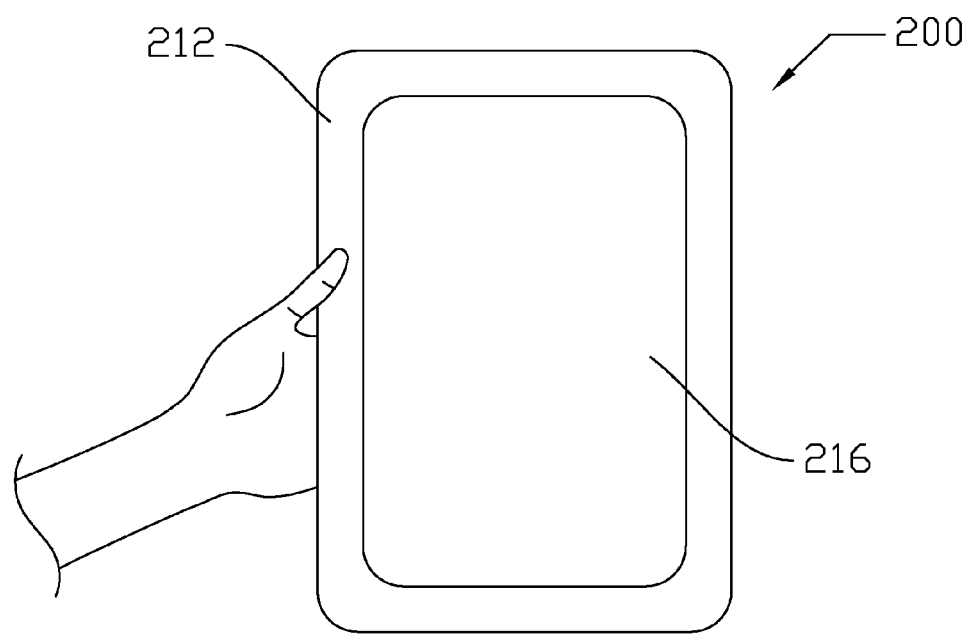
Figure 1C:
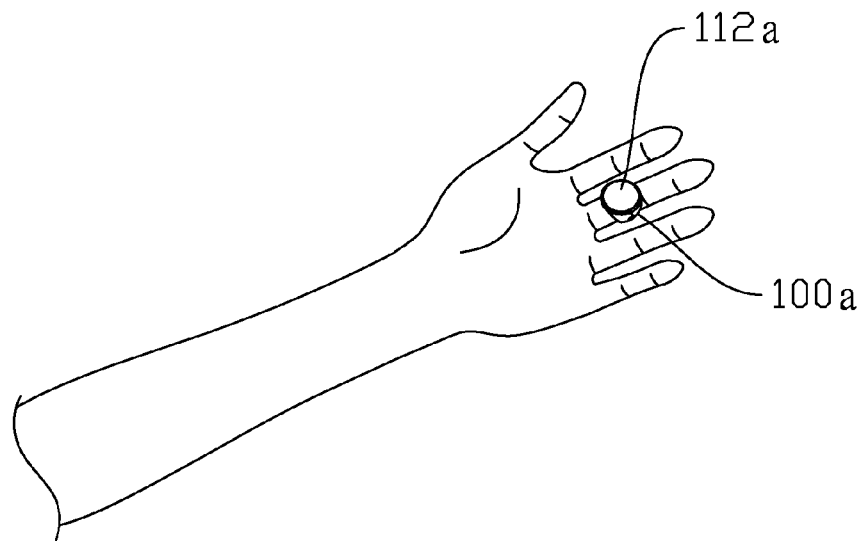
FIG. 1C and FIG. 1D is a schematic view illustrating that a user wears the holder depicted in FIG. 1A and FIG. 1B.
Figure 1D:
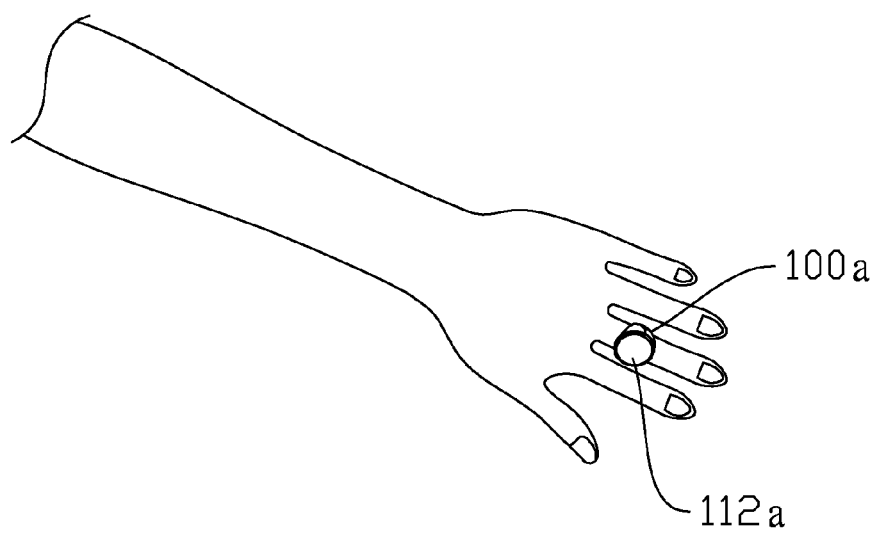

FIG. 1A and FIG. 1B is a schematic view illustrating that a user operates the portable electronic device according to an embodiment of the present invention, and FIG. 1C and FIG. 1D is a schematic view illustrating that a user wears the holder depicted in FIG. 1A and FIG. 1B. Referring to FIG. 1A, FIG. 1B, FIG. 1C, and FIG. 1D, a portable electronic module of this embodiment includes a holder 100a and a portable electronic device 200. For example, the portable electronic device 200 is a tablet PC. The holder 100a is suited to be worn on a user's finger, and the portable electronic device 200 can held firmly by the combination of the holder 100a and portable electronic device 200. The combination of the holder 100a and portable electronic device 200 is, for example, the magnetic connection, including but not limited to this type. As such, the user can hold the portable electronic device 200 firmly in just one hand, and can operate the portable electronic device 200 conveniently with the other hand.

Especially, when the user operates the portable electronic device 200, for example, tablet PC, the holder 100a can be applied to hold the portable electronic device 200 firmly, and the holder 100a also can be as a finger decoration or as a ring (as showing FIG. 1D) when the user does not carry the portable electronic device 200. In addition, the combination mode and mean between the holder 100a and the portable electronic device 200 are all within the spirit and scope of this invention. The components of the holder 100a and portable electronic device 200 and the connecting relation among these components will be detailed described as following.

In the present embodiment, the portable electronic device 200 has a first surface 212, a second surface 214 corresponding to the first surface 212, and a display unit 216, the display unit 216 is disposed on the first surface 212 of the portable electronic device 200, and the second surface 214 has a connecting region 214a. In this embodiment, the connecting region 214a is, for example, a specific region with magnetism in the second surface 214, and the holder 100a can be attracted to the specific region.

Figure 2A:
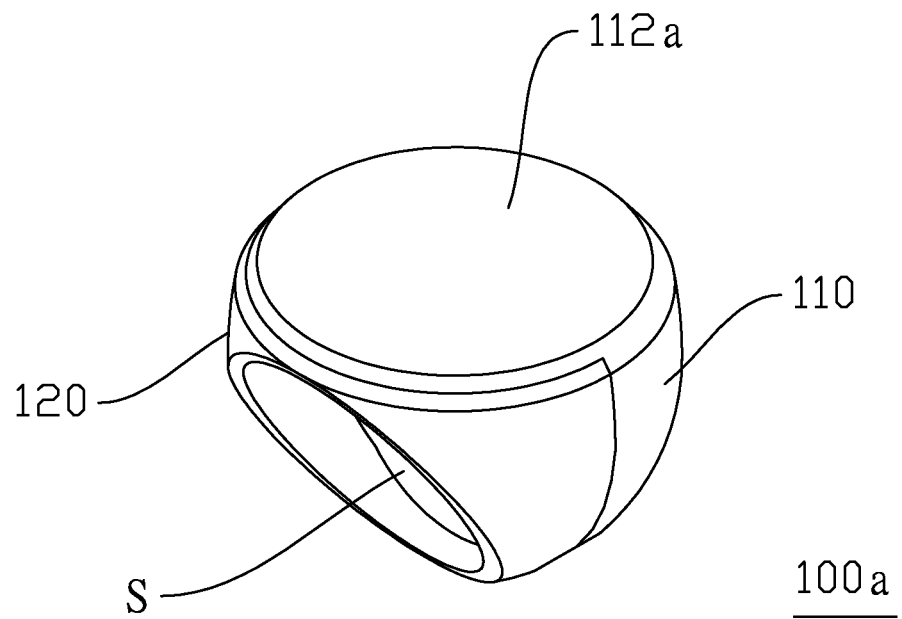
FIG. 2A is a schematic view illustrating the holder according to one embodiment of the present invention.
Figure 2B:
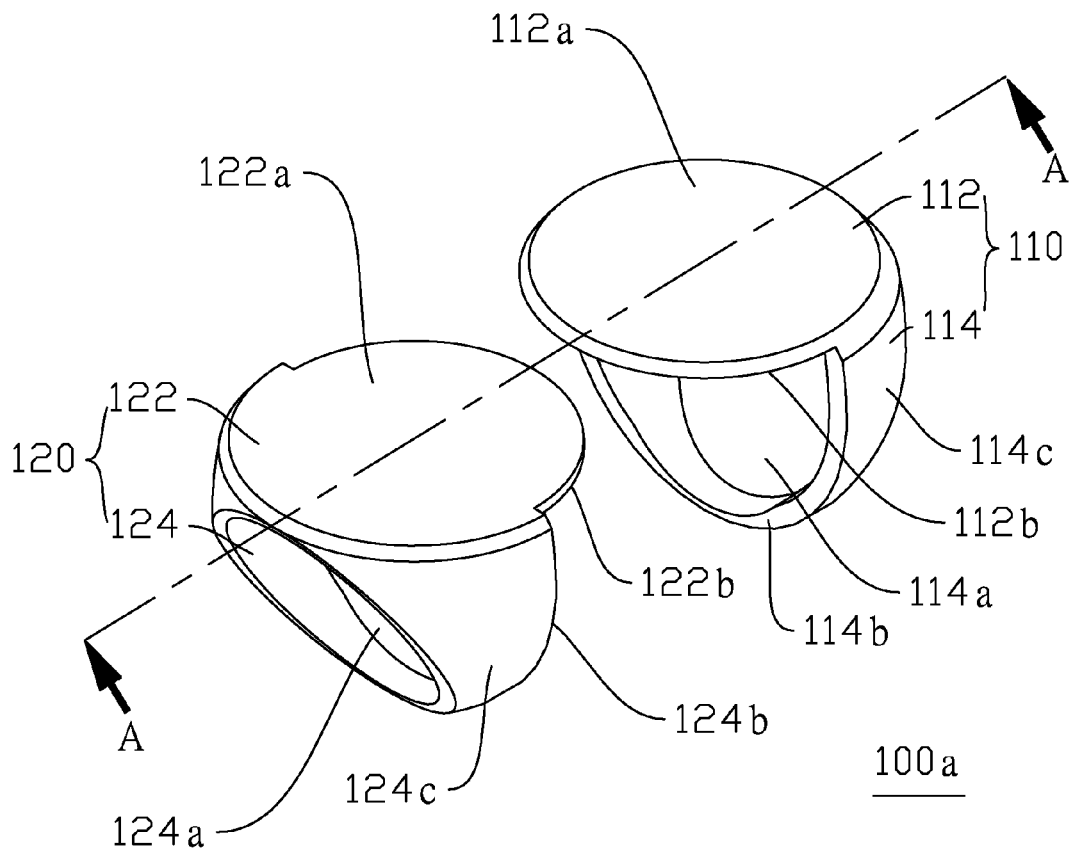
FIG. 2B is an exploded view illustrating the holder depicted in FIG. 2A.
Figure 2C:
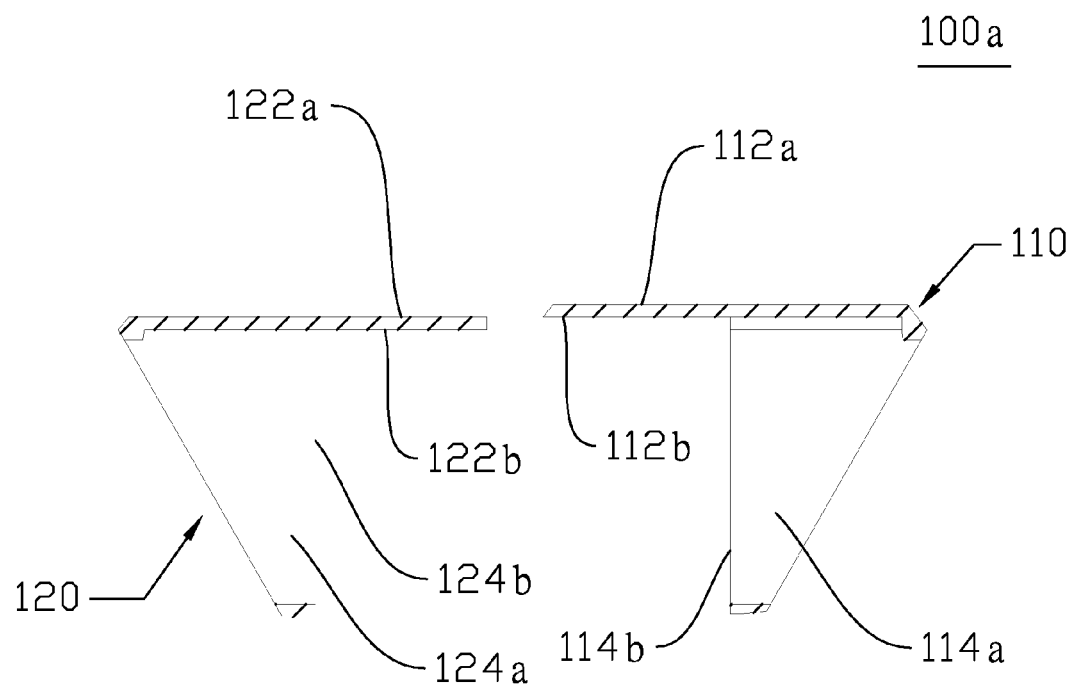
FIG. 2C is a cross sectional view taken along line A-A illustrating the holder depicted in FIG. 2B.

Referring to FIG. 2A, FIG. 2B, and FIG. 2C (FIG. 2A is a schematic view illustrating the holder 100a according to one embodiment of the present invention, FIG. 2B is an exploded view illustrating the holder 100a depicted in FIG. 2A, and FIG. 2C is a cross sectional view taken along line A-A illustrating the holder depicted in FIG. 2B), the holder 100a of the present embodiment includes a first body 110 and a second body 120, the second body 120 is suited to connect with the first body 110, wherein the first body 110 includes a first connecting portion 112 and a first wearing portion 114, the first wearing portion 114 is extended from the bottom of the first connecting portion 112, the first connecting portion 112 has a first connecting surface 112a and a third connecting surface 112b, and the first wearing portion 114 has a first through hole 114a and a fifth connecting surface 114b. On the other hand, the second body 120 includes a second connecting portion 122 and a second wearing portion 124, the second wearing portion 124 is extended from the bottom of the second connecting portion 122, the second connecting portion 122 has a second connecting surface 122a and a fourth connecting surface 122b, and the second wearing portion 124 has a second through hole 124a and a sixth connecting surface 124b. In addition, the first wearing portion 114 has a first outside surface 114c, the second wearing portion 124 further has a second outside surface 124c, the first outside surface 114c is connected with the fifth connecting surface 114b, the second outside surface 124c is connected with the sixth connecting surface 124b, and the first outside surface 114c and the second outside surface 124c are, for example, curved surface.

When the first body 110 and second body 120 are connected with each other, the second connecting portion 122 is suited to connected with the first connecting portion 112, and the first connecting portion 112 is suited to connected with the connecting region 214a of the portable electronic device 200, and then there is a firm connection between the holder 100a and the portable electronic device 200. More specifically, in the present embodiment, the first connecting surface 112a is a top surface of the first connecting portion 112, the third connecting surface 112b is corresponding to the first connecting surface 112a, and is a bottom surface of the first connecting portion 112. The second connecting surface 122a is a top surface of the second connecting portion 122, the fourth connecting surface 122b is corresponding to the second connecting surface 122a, and is a bottom surface of the second connecting portion 122. When the first body 110 and the second body 120 are connected with each other, the first connecting surface 112a is connected with the connecting region 214a of the portable electronic device 200, the second connecting surface 122a is connected with the third connecting surface 112b.

From the above, in order to have a firm connection among the first body 110, the second body 120 and the connecting region 214a, the first connecting portion 112, the second connecting portion 122 and the connecting region 214a have suitable magnetism individually in the present embodiment, so as the first body 110 and the second body 120 can attract with each other firmly, and the holder 100a can attract the portable electronic device 200 by the first body 110 firmly. In the present embodiment, because the first connecting surface 112a is corresponding to the third connecting surface 112b, so the magnetism of the first connecting surface 112a is, for example, the magnetic pole of first connecting surface 112a is opposite to magnetic pole of third connecting surface 112b, and the magnetism of the second connecting surface 122a, for example, magnetic pole of second connecting surface 122a is opposite to the magnetic pole of third connecting surface 112b. And, the magnetism of the first connecting surface 112a is, for example, the same magnetic pole of the second connecting surface 122a. In addition, the magnetism of the first connecting surface 112a is, for example, magnetic pole of first connecting surface 112a is opposite to the magnetic pole of the connecting region 214a.

Therefore, the first body 110 can connect with the second body 120 firmly by the magnetic attraction between the third connecting surface 112b and the second connecting surface 122a, and the holder 100a can connect with the portable electronic device 200 by the magnetic attraction between the first connecting surface 112a of the first body 110 and the connecting region 214a. In the present embodiment, the surface area of the second connecting surface 122a is, for example, the same as the surface area of the third connecting surface 112b substantially, and when the first connecting portion 112 is connected with the second connecting portion 122, the second connecting surface 122a is, for example, coplanar with the third connecting surface 112b. Because the second connecting surface 122a and the third connecting surface 112b are coplanar, and the surface area of the second connecting surface 122a is, for example, the same as the surface area of the third connecting surface 112b substantially, so there has a better magnetic attraction between the second connecting surface 122a and the third connecting surface 112b to permit the first body 110 attracting to the second body 120 more firmly.

On the other hand, when the first body 110 and the second body 120 are connected with each other, the first wearing portion 114 and the second wearing portion 124 are also connected, the fifth connecting surface 114b and the sixth connecting surface 124b are connected with each other, and the first through hole 114a is intercommunicated with the second through hole 124a. The fifth connecting surface 114b and sixth connecting surface 124b are connected with each other by the magnetic attraction, and then a magnetic attraction between the fifth connecting surface 114b and the sixth connecting surface 124b is provided in addition to the magnetic attraction provided between the second connecting surface 122a and the third connecting surface 112b in the combination of the first body 110 and the second body 120, so as to permit the first body 110 connecting with the second body 120 firmly. Besides, a wearing space S is formed by the intercommunication of the first through hole 114a and the second through hole 124a, and the user can hold the portable electronic device 200 effectively by the mean of wearing the holder 100a through to the wearing space S.

In the present embodiment, worth mentioning is that the height of the first body 110 is, for example, higher than the height of the second body 120, so the second connecting surface 122a of the second body 120 can attach to the third connecting surface of the first body 110 when the first body 110 and the second body 120 are connected with each other, and then permits the first body 110 connecting to the second body 120 closely.

The holder 100a of the present invention has described in above embodiment depicted in FIG. 2A and FIG. 2B. Hereinafter, there also has various embodiments that be illustrated in detail as following. Moreover, the component reference numbers illustrated in the following description will refer to the same as the above description.

Figure 3A:
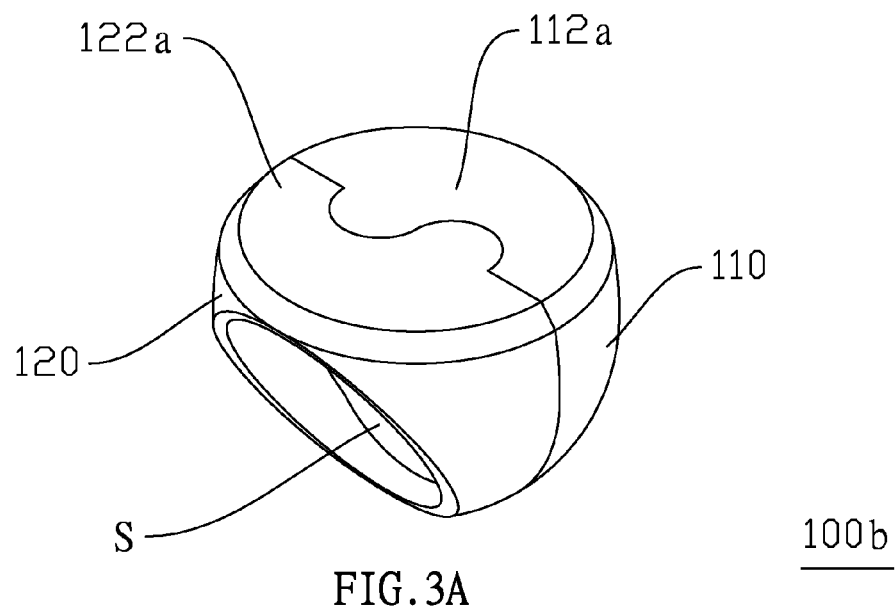
FIG. 3A is a schematic view illustrating the holder according to one embodiment of the present invention.
Figure 3B:
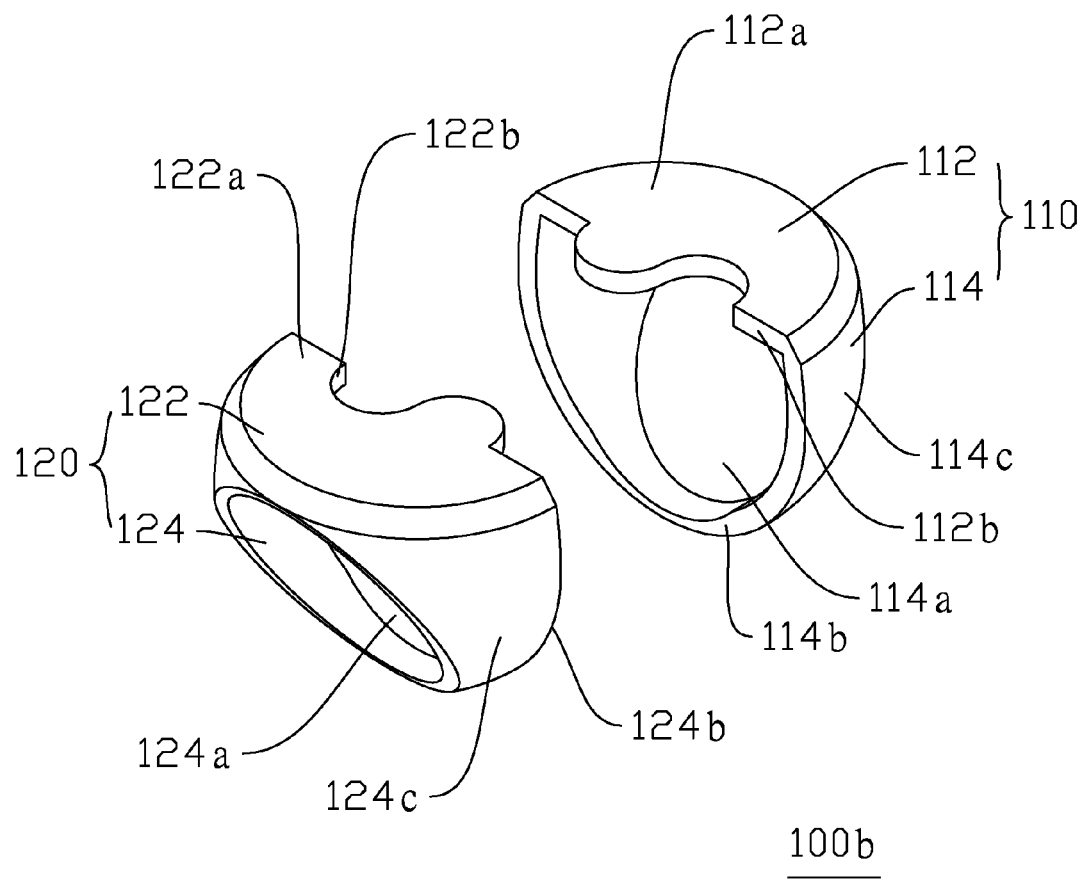
FIG. 3B is an exploded view illustrating the holder depicted in FIG. 3A.
Figure 3C:
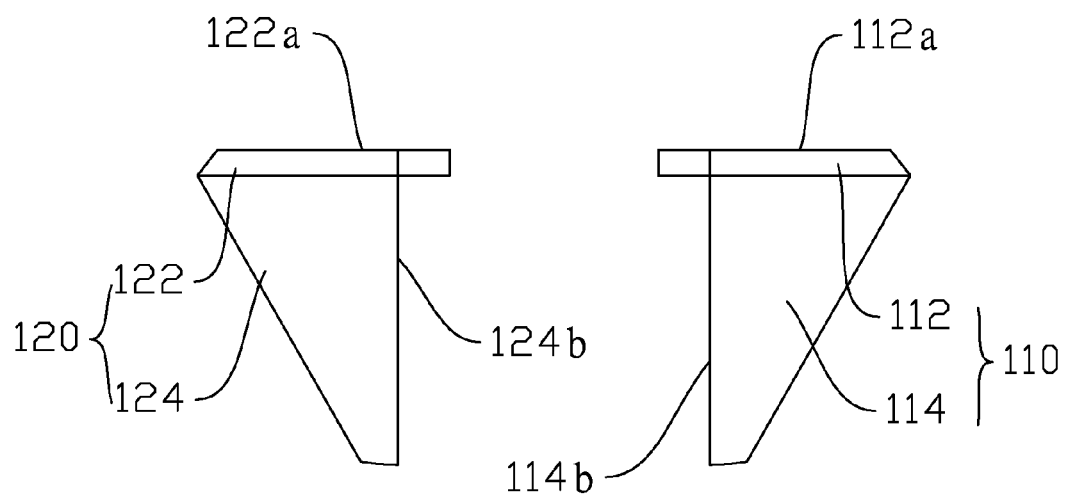
FIG. 3C is a cross sectional view illustrating the holder depicted in FIG. 3B.

Please refer to FIG. 3A, FIG. 3B, and FIG. 3C, FIG. 3A is a schematic view illustrating the holder according to one embodiment of the present invention, FIG. 3B is an exploded view illustrating the holder depicted in FIG. 3A, and FIG. 3C is a cross sectional view illustrating the holder depicted in FIG. 3B. The holder 100b of this embodiment is similar to the holder 100a depicted in FIG. 2A and FIG. 2B, the main difference of those is: the holder 100b of this embodiment is connected with the connecting region 214a of the portable electronic device 200 by both of the first connecting surface 112a and the second connecting surface 122a, and then the function of holding the portable electronic device 200 is provided. The combination of these components of the holder 100b will be described in detail as following.

In this embodiment, the first connecting surface 112a is also the top surface of the first connecting portion 112, and the third connecting surface 112b is defined as the side surface connected to the top surface of the first connecting portion 112. Similar to the first connecting portion 112, the second connecting surface 122a is also the top surface of the second connecting portion 122, and the fourth connecting surface 122b is defined as the side surface connected to the top surface of the second connecting portion 122. The connecting area of the first connecting surface 112a is, for example, the same as the connecting area of the second connecting surface 122a substantially, and the connecting area of the first connecting surface 112a is, for example, half of the connecting area of the first connecting surface 112a substantially in above embodiment (please refer to FIG. 3A and FIG. 3B). When the first body 110 is connected with the second body 120 to permit the first connecting surface 112a and the second connecting surface 122a connecting to the connecting region 214a of the portable electronic device 200 simultaneously, the third connecting surface 112b is suited to connect with the fourth connecting surface 122b.

Moreover, in order to have the firm connection among the first body 110, the second body 120 and connecting region 214a, the first connecting surface 112a and the second connecting surface 122a are coplanar when the first body 110 and the second body 120 are connected with each other in the present embodiment. The third connecting surface 112b and the fourth connecting surface 122b are also coplanar to permit the first body 110 connecting to the second body 120 closely. Besides, the first connecting portion 112, the second connecting portion 122 and connecting region 214a are magnetisms. In detail, the first connecting portion 112, the second connecting portion 122, and connecting region 214a is suitable magnetism in the present embodiment individually to permit the first body 110 attracting to the second body 120 firmly, and then the holder 100b can attract to the portable electronic device 200 by the first body 110 firmly. The magnetic pole of the first connecting surface 112a is, for example, the same as the magnetic pole of the second connecting surface 122a, the magnetic pole of the third connecting surface 112b is, for example, opposite magnetic pole to the fourth connecting surface 122b, and the magnetic pole of the first connecting surface 112a is, for example, opposite magnetic pole to the connecting region 214a. Thereby, the holder 100b can hold the portable electronic device 200 firmly by the attraction between the connecting region 214a and the combination of the first connecting surface 112a and the second connecting surface 122a. The holder 100b of the present embodiment is similar to the holder 100a depicted in FIG. 1A that also can attract to the connecting region 214a, and the details will not be described herein again.

Similar to the holder 100a depicted in FIG. 2A and FIG. 2B, when the first body 110 and the second body 120 are connected with each other, the first wearing portion 114 is also connected with the second wearing portion 124, the fifth connecting surface 114b is connected with the sixth connecting surface 124b, and the first through hole 114 is intercommunicated with the second through hole 124a. A wearing space S is formed by the intercommunication of the first through hole 114a and the second through hole 124a, and the user's finger can wear the holder 100b through the wearing space S, and then hold the portable electronic device 200 effectively.

Figure 3D:
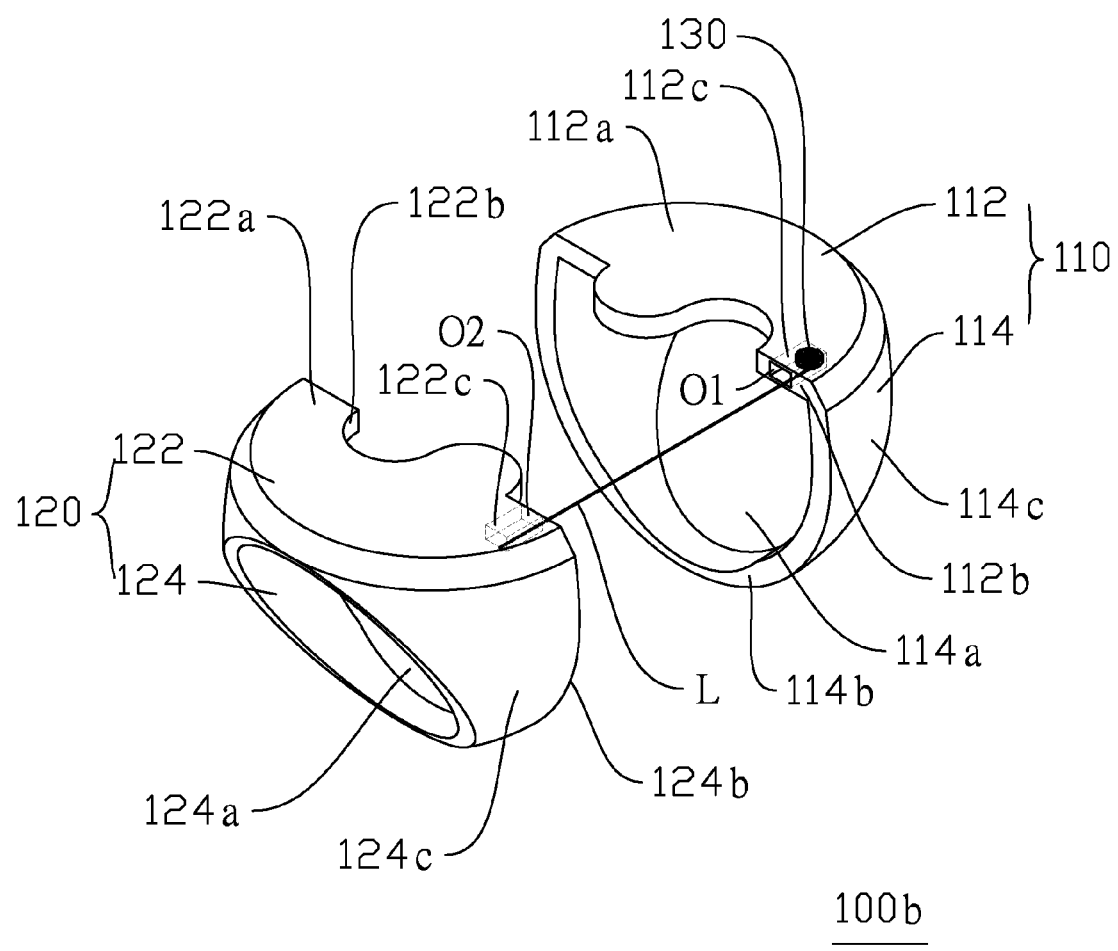
FIG. 3D is a schematic view illustrating the holder depicted in FIG. 3C is added to a wire-winding unit.
Figure 3E:
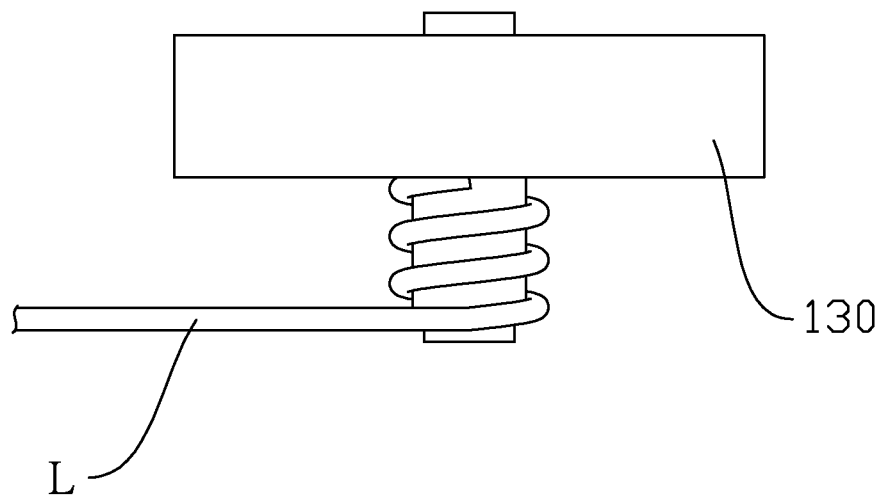
FIG. 3E is a schematic view illustrating the wire-winding unit depicted in FIG. 3D.

In addition, the holder 100b of the present embodiment further comprises a wire-winding unit 130 (as shown in FIG. 3D and FIG. 3E, FIG. 3D is a schematic view illustrating the holder depicted in FIG. 3C is added to a wire-rolling unit, and FIG. 3E is a schematic view illustrating the wire-winding unit 130 depicted in FIG. 3D), the wire-winding unit 130 is, for example, a element with a torsional spring, and the first connecting portion 112 has a first accommodating space 112c, the second connecting portion 122 has a second accommodating space 122c, the third connecting surface 112b has a first opening O1, the fourth connecting surface 122b has a second opening O2, wherein the wire-winding unit 130 is disposed in one of the first accommodating space 112c and the second accommodating space 122c, and a connecting wire L of the wire-winding unit 130 is suited to connect to another of the first accommodating space 112c and the second accommodating space 122c from the first opening O1 or the second opening O2.

In the present embodiment, the wire-winding unit 130 is disposed in the first accommodating space 112c, and the connecting wire L of the wire-winding unit 130 is connected to the second accommodating space 122c through the first opening O1. Thus, when the first connecting portion 112 is not connected with the second connecting portion 122, the connecting wire L is pulled by the second connecting portion 122, and a portion of the connecting wire L be exposed out of the first connecting portion 112 and the second connecting portion 122. When the first connecting portion 112 and the second connecting portion 122 are fixed in suitable positions individually, the portable electronic device 200 or other appliances are suitable to hang at the portion of the connecting wire L exposed out of the first connecting portion 112 and the second connecting portion 122. Certainly, when the second connecting portion 122 is connected with the first connecting portion 112 again, the connecting wire L is pulled by the wire-winding unit 130 to permit the connecting wire L returning to the first accommodating space 112c, and not to exposed out of the first connecting portion 112 and the second connecting portion 122.

Figure 3F:
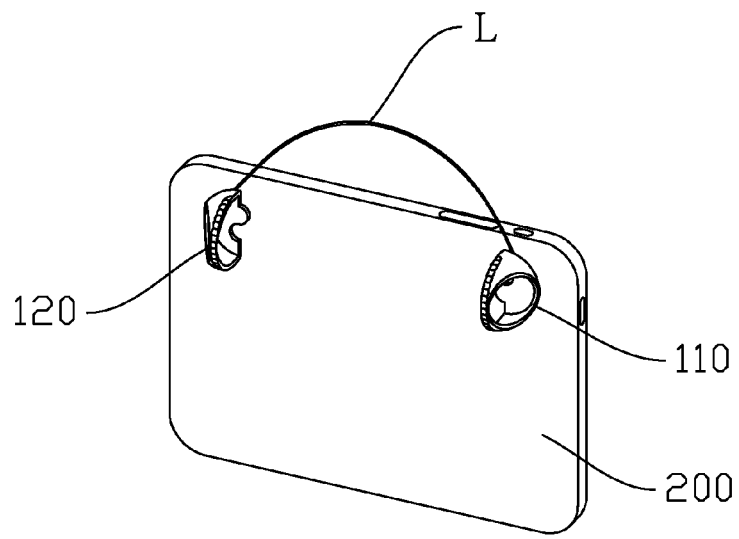
FIG. 3F is a schematic view illustrating the wire-winding unit depicted in FIG. 3D is in an operating state.
Figure 3G:
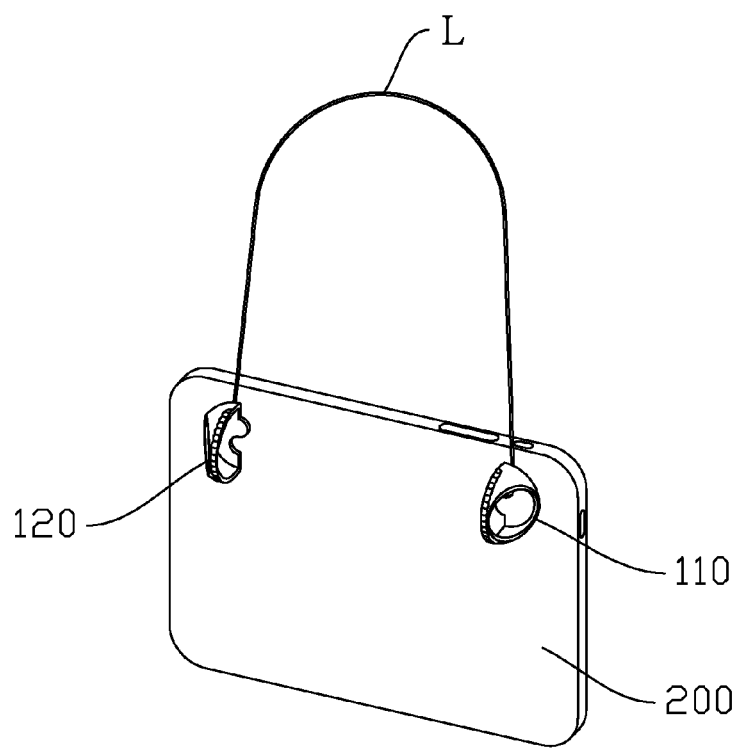
FIG. 3G is a schematic view illustrating the wire-winding unit depicted in FIG. 3D is in another operating state.

Further, the holder 100b of the present embodiment in an operating state is shown in FIGS. 3F and 3G, the first body 110 and the second body 120 are disposed in two sides of the portable electronic device 200 individually, and the first body 110 and the second body 120 can magnetic attract to the portable electronic device 200 firmly, like the above embodiment depicted in FIG. 2A and FIG. 2B. As shown in FIG. 3F, the connecting wire L can be pulled out and hang on the wall hook (not shown in FIG. 3F), or be carried at the user's shoulder, as shown in FIG. 3G.

Figure 4A:
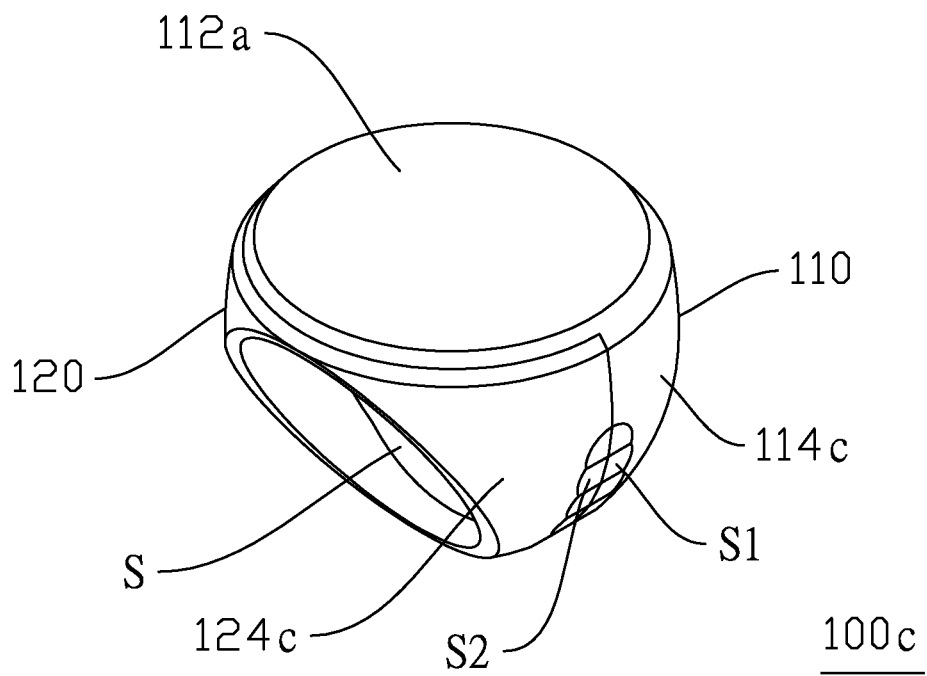
FIG. 4A is a schematic view illustrating the holder according to one embodiment of the present invention.
Figure 4B:
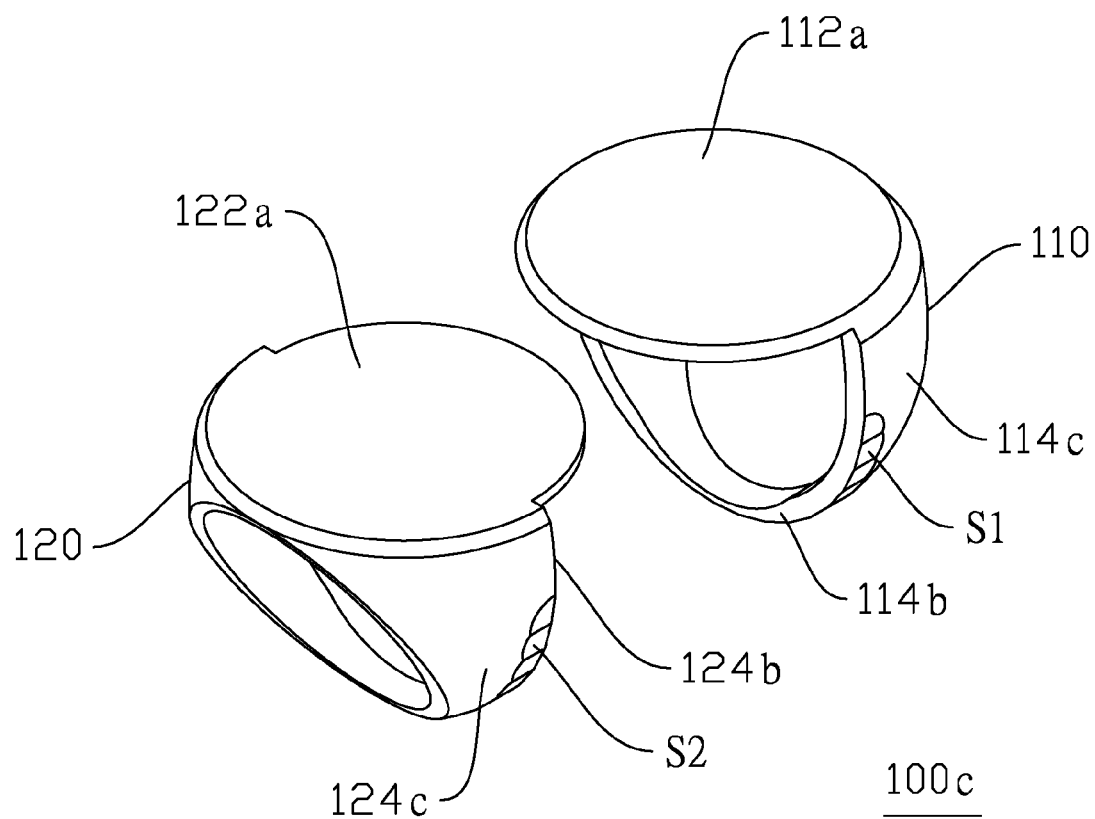
FIG. 4B is an exploded view illustrating the holder depicted in FIG. 4A.
Figure 4C:
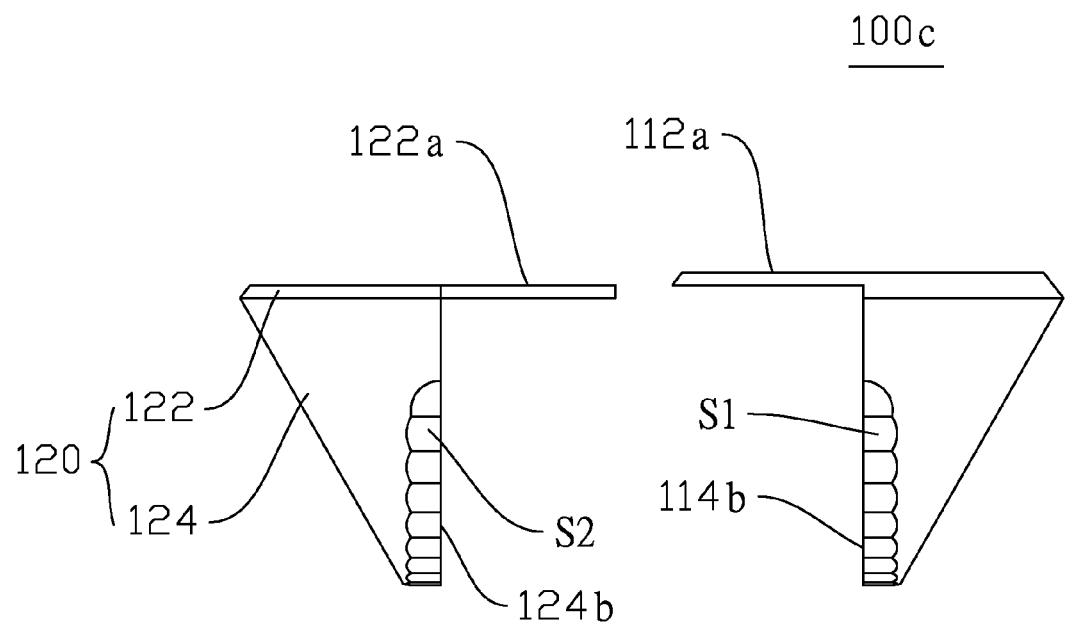
FIG. 4C is a cross sectional view illustrating the holder depicted in FIG. 4B.

FIG. 4A is a schematic view illustrating the holder 100c according to one embodiment of the present invention, FIG. 4B is an explode view illustrating the holder depicted in FIG. 4A, and FIG. 4C is a cross sectional view illustrating the holder depicted in FIG. 4B. Please refer to FIG. 4A, FIG. 4B, and FIG. 4C, the holder 100c of the present embodiment is similar to the holder 100a depicted in FIG. 2A and FIG. 2B, the main difference of those is: there are multiple first sections S1 arranged in the first outside surface 114c adjacent to the fifth connecting surface 114b in the present embodiment, and there are multiple second sections S2 arranged in the second outside surface 124 adjacent to the sixth connecting surface 124b in the present embodiment, wherein the second sections S2 are corresponding to the first sections S1, and these first sections S1 and these second sections S2 are continuous sections. When the first body 110 and the second body 120 are connected with each other, each first section S1 is connected with each second section S2 corresponding to the first section S1. Worth mentioning is that each first section S1 is connected with the second section S2 corresponding to the first section S1, and the first section S1 and the second section S2 are coplanar when the first body 110 and the second body 120 are connected with each other.

Figure 5A:
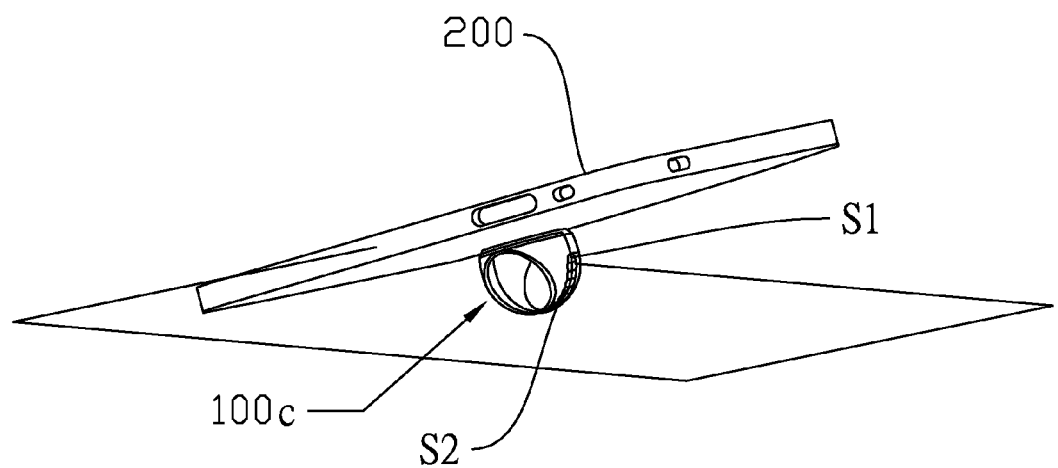
FIG. 5A is a schematic view illustrating the combination of the holder and the portable electronic device depicted in FIG. 4A.
Figure 5B:
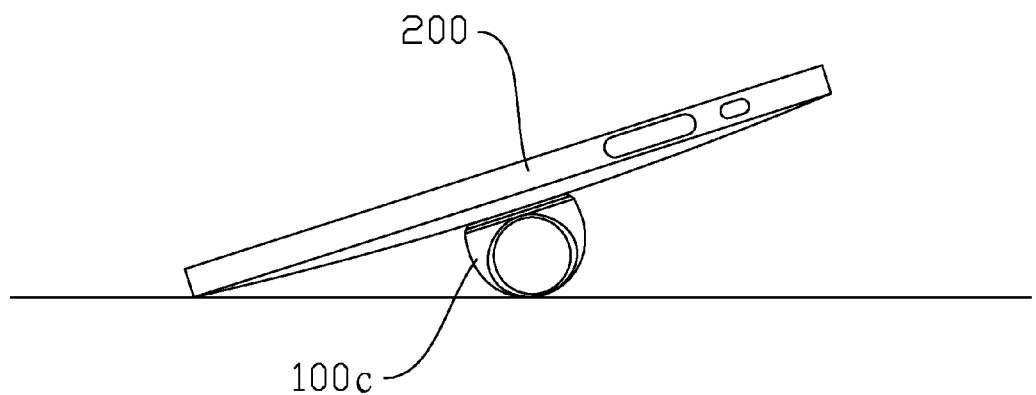
FIG. 5B is a side view illustrating the combination of the holder and the portable electronic device depicted in FIG. 5A.
Figure 5C:
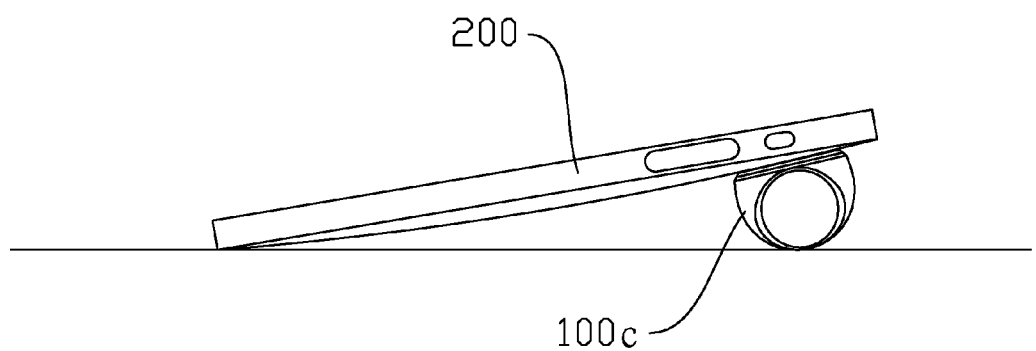
FIG. 5C is a side view illustrating the combination of the holder and the portable electronic device depicted in FIG. 5B at another connecting position.

Therefore, the user's finger can wear the holder 100c through the wearing space S to hold the portable electronic device 200, the holder 100c also can disposed in the back of the portable electronic device 200, as such the portable electronic device 200 can placed on a table by these sections stably. (as shown in FIG. 5A, FIG. 5A is a schematic view illustrating the combination of the holder 100c and the portable electronic device 200 depicted in FIG. 4A) In addition, the user also can change the connection position between the holder 100c and the portable electronic device 200 to adjust the displaying view angle of the portable electronic device 200, and then will be convenient to browse or operate for the user. (as shown in FIG. 5B and FIG. 5C, FIG. 5B is a side view illustrating the combination of the holder 100c and the portable electronic device 200 depicted in FIG. 5A, and FIG. 5C is a side view illustrating the combination of the holder 100c and the portable electronic device 200 depicted in FIG. 5B at another connecting position).

Figure 6A:
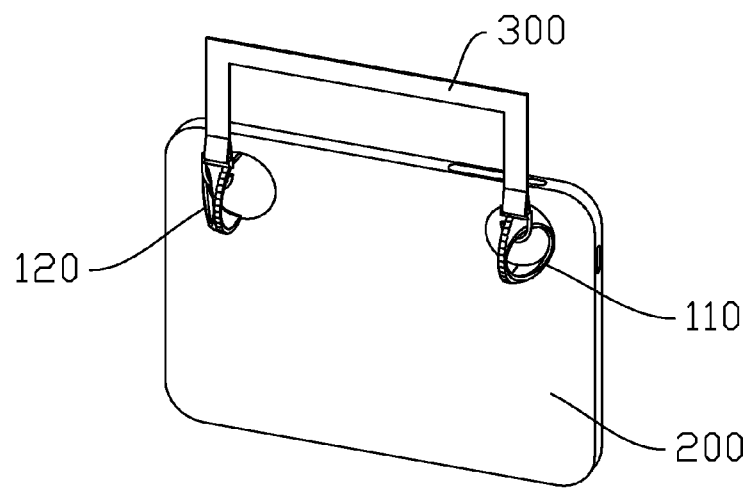
FIG. 6A is a schematic view illustrating that the first body and the second body depicted in FIG. 4B are connected to the portable electronic device individually, and then a carrying belt is connected between the first body and the second body.
Figure 6B:
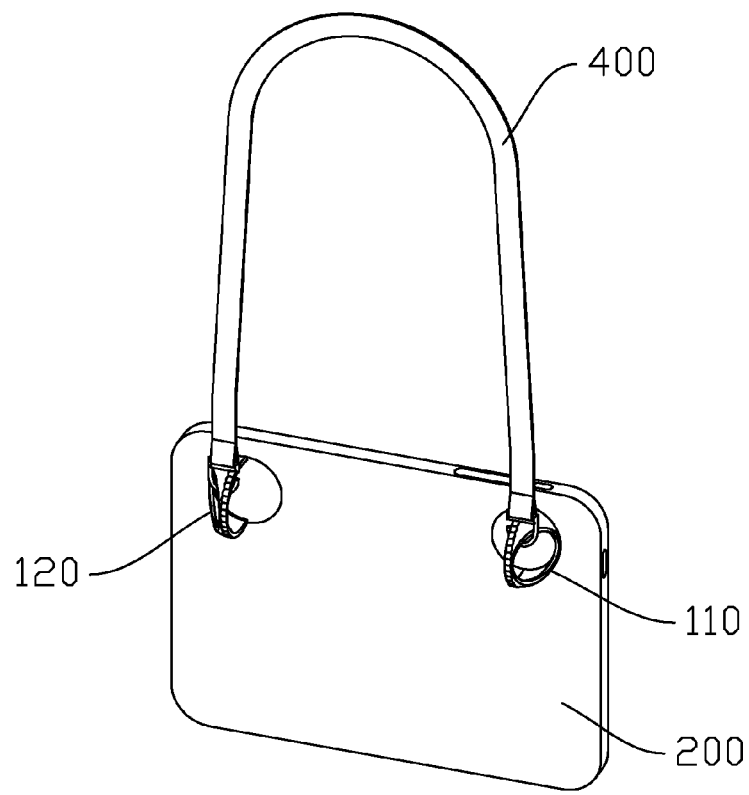
FIG. 6B is a schematic view illustrating that the first body and the second body depicted in FIG. 4B are connected to the portable electronic device individually, and then a strap is connected between the first body and the second body.

From the above, two connecting regions 214a with magnetism can be set on the suitable positions of the second surface 214 in the portable electronic device 200 in the present embodiment, so the first body 110 and the second body 120 depicted in FIG. 4A, and FIG. 4B can attract to the two the connecting regions 214a individually, wherein the first body 110 and the second body 120 are, for example, magnets. Thereby, a carrying belt 300 or a strap 400 can connects between the first body 110 and the second body 120, and a convenient method of carrying the portable electronic device 200 for the user is provided. (as shown in FIG. 6A and FIG. 6B, FIG. 6A is a schematic view illustrating that the first body and the second body depicted in FIG. 4B are connected to the portable electronic device 200 individually, and then a carrying belt 300 is connected between the first body 110 and the second body 120, and FIG. 6B is a schematic view illustrating that the first body 110 and the second body 120 depicted in FIG. 4B are connected to the portable electronic device 200 individually, and then a strap 400 is connected between the first body 110 and the second body 120).

Figure 7A:
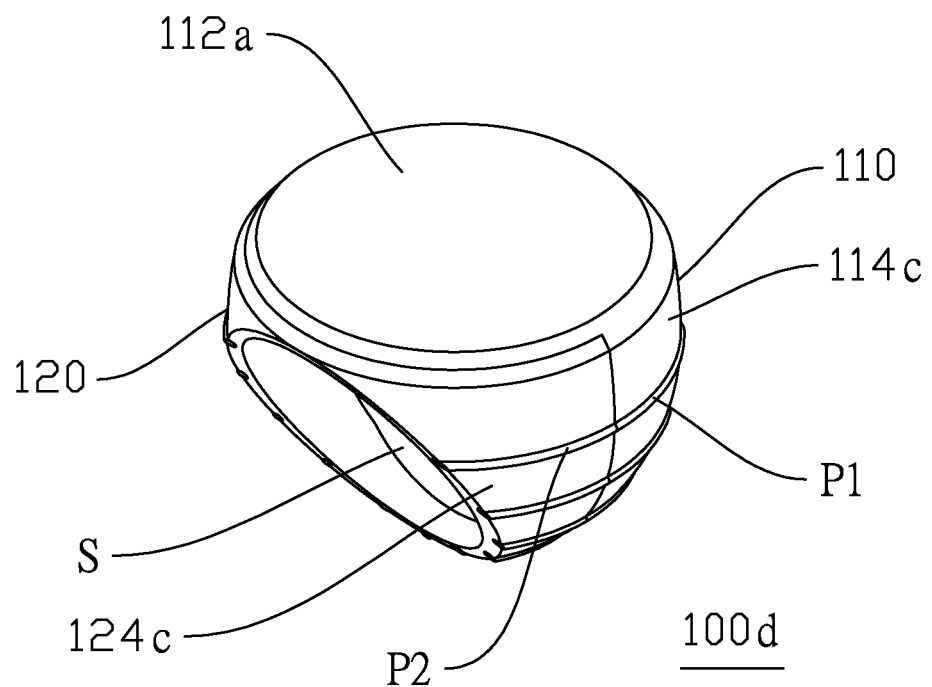
FIG. 7A is a schematic view illustrating the holder according to one embodiment of the present invention.
Figure 7B:
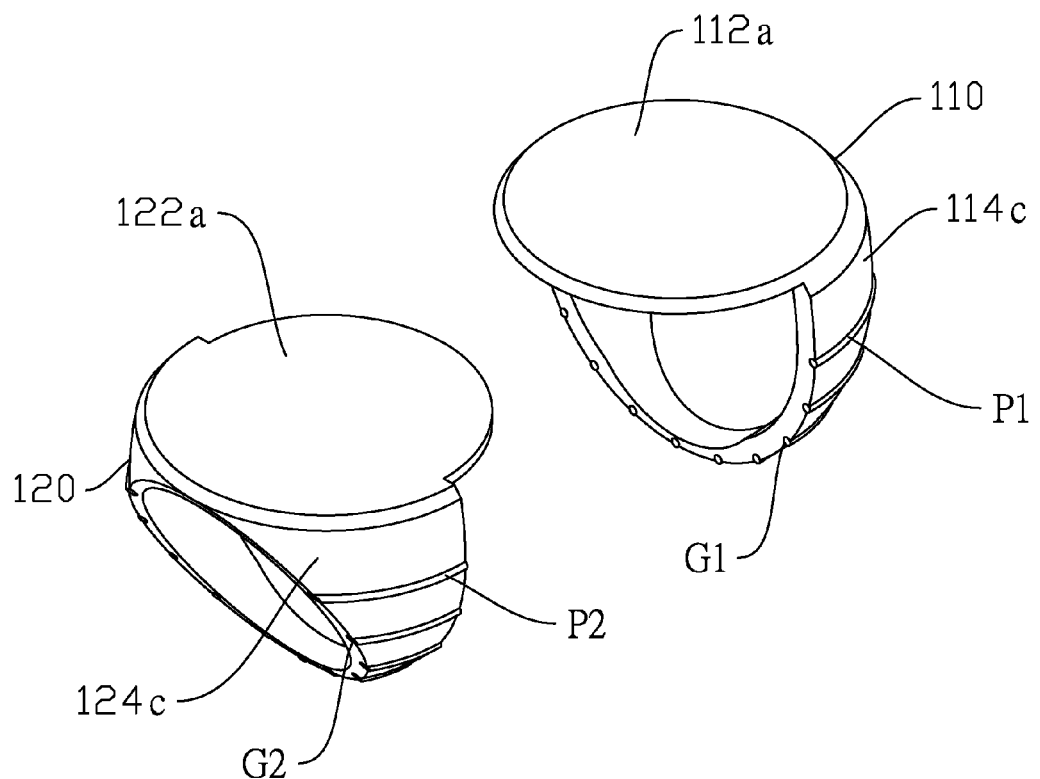
FIG. 7B is an exploded view illustrating the holder depicted in FIG. 7A.
Figure 7C:
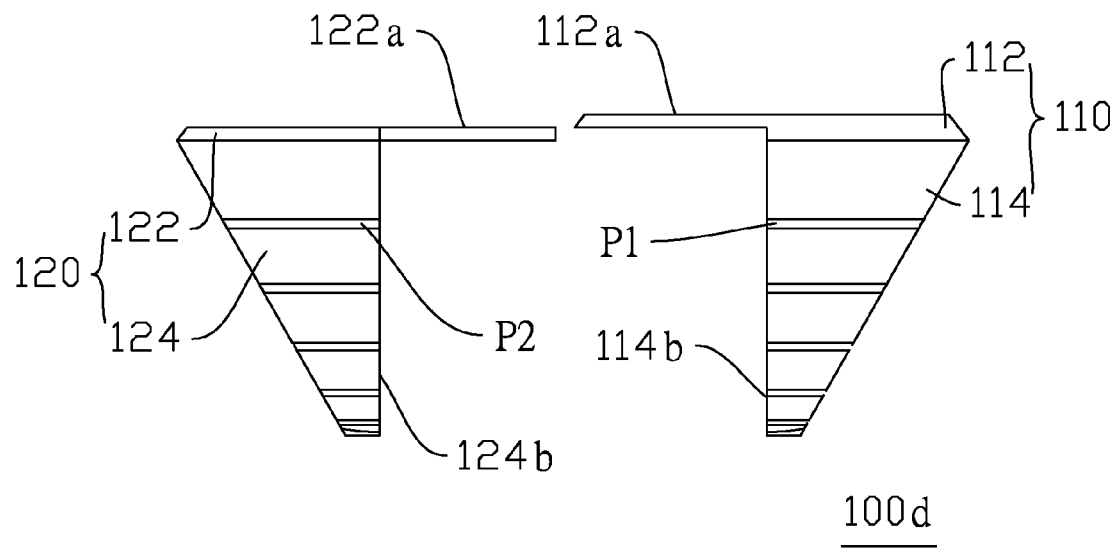
FIG. 7C is a cross sectional view illustrating the holder depicted in FIG. 7B.

FIG. 7A is a schematic view illustrating the holder 100d according to one embodiment of the present invention, FIG. 7B is an explode view illustrating the holder 100d depicted in FIG. 7A, and FIG. 7C is a cross sectional view illustrating the holder 100d depicted in FIG. 7B. Please refer to FIG. 7A, FIG. 7B, and FIG. 7C, the holder 100d of the present embodiment is similar to the holder 100a depicted in FIG. 2A and FIG. 2B, wherein the main difference of those is: there are multiple first protrusions P1 arranged on the first outside surface 114c in the present embodiment, and there are multiple second protrusions P2 arranged on the second outside surface 124c in the present embodiment, wherein these second protrusions P2 are corresponding to these first protrusions P1. When the first body 110 and the second body 120 are connected with each other, each first protrusion P1 is connected with the second protrusion P2 corresponding to the first protrusion P1, and these protrusions are protruded out of the outside surface of the holder 100d.

Furthermore, there are multiple first grooves G1 arranged on the first outside surface 114c in the present embodiment, and there are multiple second grooves G2 arranged on the second outside surface 124c in the present embodiment, wherein these first grooves G1 are corresponding to these first protrusions P1, and these second grooves G2 are corresponding to these second protrusions P2. These first protrusions P1 and these second protrusions P2 are, for example, elastic protruding ribs, embedded at these first grooves G1 and these second grooves G2 respectively. Thereby, the user's finger can wear the holder 100d through the wearing space S to hold the portable electronic device 200, and the portable electronic device 200 can placed on a table stably by these protrusions which provides suitable friction against the table when the holder 100d is connected with the portable electronic device 200. Certainly, the holder 100d of the present embodiment also can be applied to adjust various displaying view angle of the portable electronic device 200 by the mode depicted in FIG. 5B and FIG. 5C, and then will be convenient to browse or operate for the user.

Figure 8A:
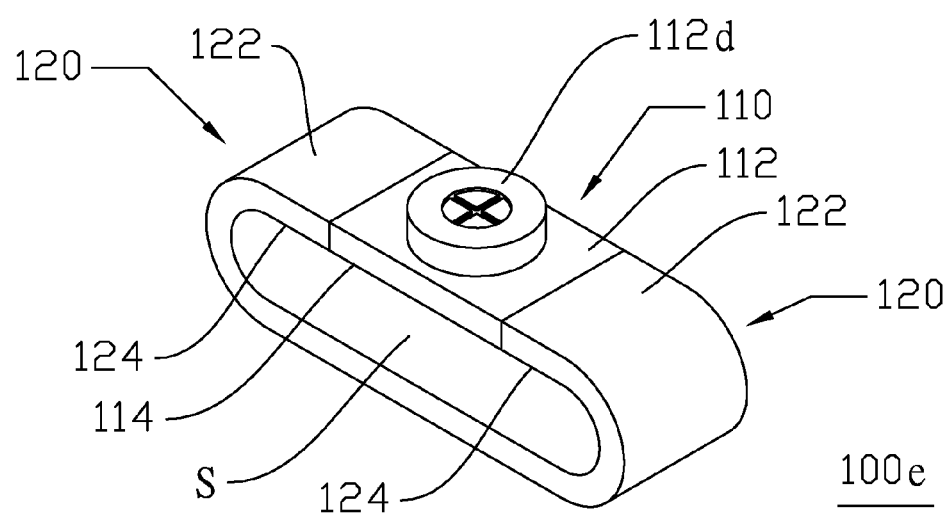
FIG. 8A is a schematic view illustrating the holder according to one embodiment of the present invention.
Figure 8B:
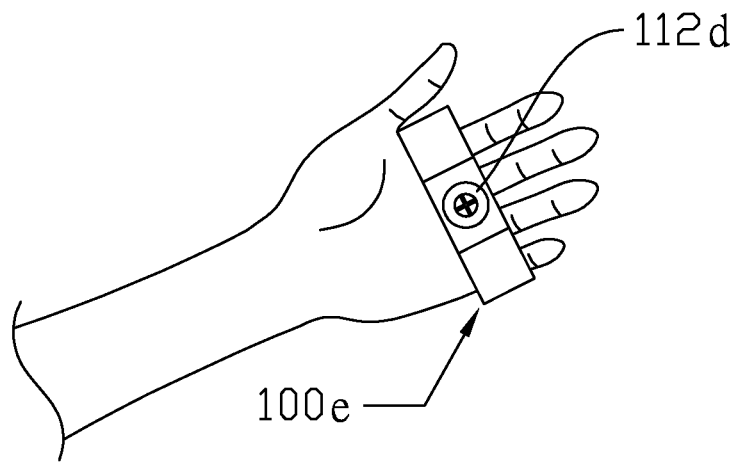
FIG. 8B is a schematic view illustrating that a user wears the holder depicted in FIG. 8A.

FIG. 8A is a schematic view illustrating the holder according to one embodiment of the present invention, and FIG. 8B is a schematic view illustrating that a user wears the holder depicted in FIG. 8A. Please refer to FIG. 8A and FIG. 8B, in the holder 100e of the present embodiment, the second body 120 is connected to two sides of the first body 110, wherein the first connecting portion 112 is dispose on the outside surface of the first body 110, the first wearing portion 114 is disposed on the inner surface of the first body 110, the second connecting portion 122 is disposed on the outside surface of the second body 120, the second wearing portion 124 is disposed on the inner surface of the second body 120, and the portable electronic device 200 is suited to disposed in the first connecting portion 112. Therefore, the first wearing portion 114 and the second wearing portion 124 are formed a ring-type opening region to be the wearing space S to permit the user's hand to wear the holder 100e through the wearing space S.

In addition, the first connecting portion 112 of the present embodiment has a connecting element 112d, the connecting element 112d is suited to connected to the connecting region 214a of the portable electronic device 200. Thereby, when the user's hand wear the holder 100e, the holder 100e can hold the portable electronic device 200 by the connecting element 112d. Certainly, the connecting element 112d is also a rotating structure, and when the connecting element 112d is connected to the portable electronic device 200, the portable electronic device 200 can rotate opposite to the first connecting portion 112. Thus, the user can have a vertical browsing mode or a horizontal browsing mode according to his browsing habit by adjusting the displaying direction of the display unit.

Figure 8C:
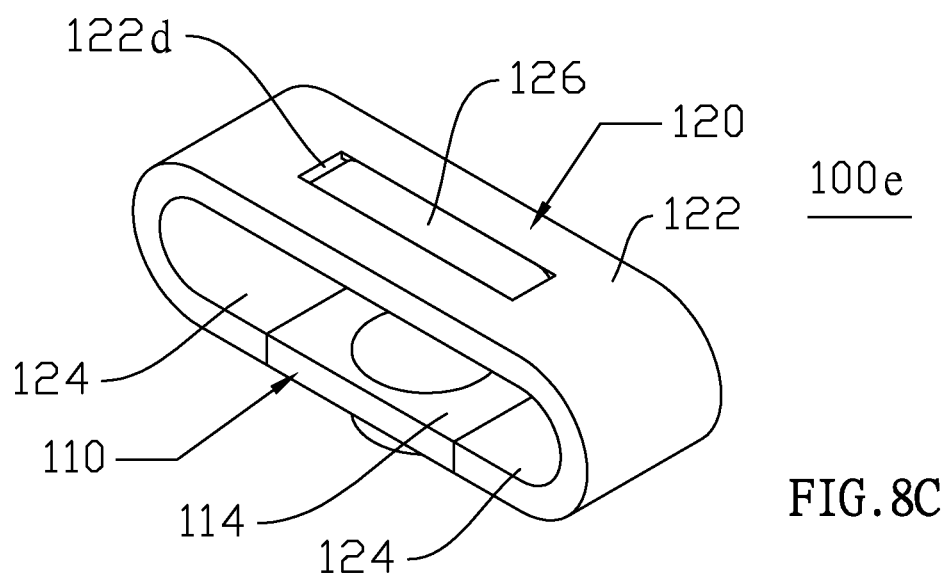
FIG. 8C is a schematic view illustrating the holder depicted in FIG. 8A in another view angle.
Figure 8D:
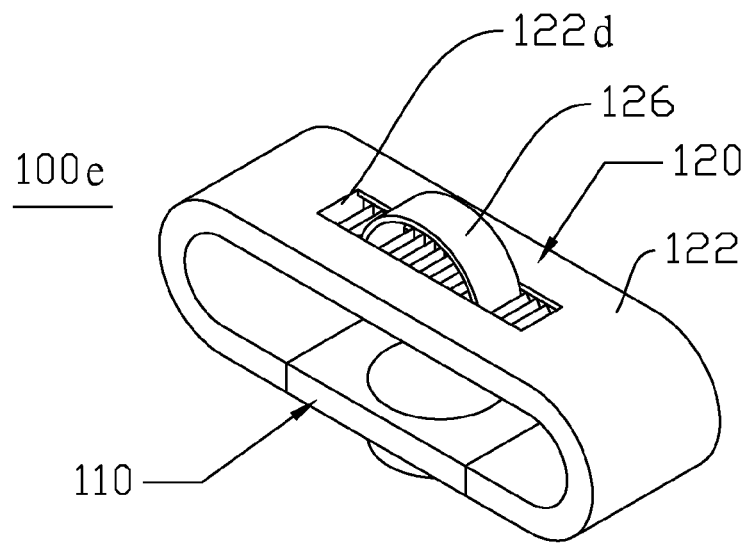
FIG. 8D is a schematic view illustrating that the holder depicted in FIG. 8C is adjusted to have a supporting function.
Figure 8E:
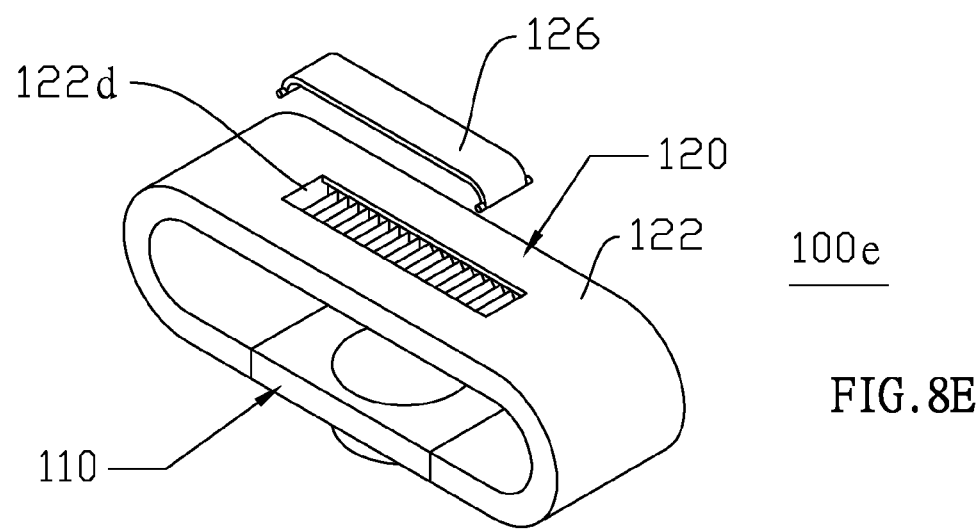
FIG. 8E is an exploded view illustrating the holder depicted in FIG. 8D.

FIG. 8C is a schematic view illustrating the holder depicted in FIG. 8A in another view angle, FIG. 8D is a schematic view illustrating that the holder depicted in FIG. 8C is adjusted to have a supporting function, and FIG. 8E is an explosive view illustrating the holder depicted in FIG. 8D. Please refer to FIG. 8C, FIG. 8D, and FIG. 8E, a guiding slot 122d can be disposed in the outside surface region of the second connecting portion 122 distant from the first connecting portion 112, and the second body 120 further comprises a supporting element 126, the two ends of the supporting element 126 are connected with guiding slot 122d actively. Worth mentioning is that the outside surface of the supporting element 126 and the outside surface of the second connecting portion 122 are coplanar when the two ends of the supporting element 126 are connected with the two ends of the guiding slot 122d individually. The outside surface of the supporting element 126 is protruded out of the outside surface of the second connecting portion 122 when at least one end of the supporting element 126 is not connected to the ends of the guiding slot 122d. Thereby, when the holder 100e of the present embodiment is connected to the portable electronic device 200, the portable electronic device 200 can be set as shown in FIG. 5A by adjusting the supporting element 126 and then will be convenient to browse or operate for the user.

Figure 9:
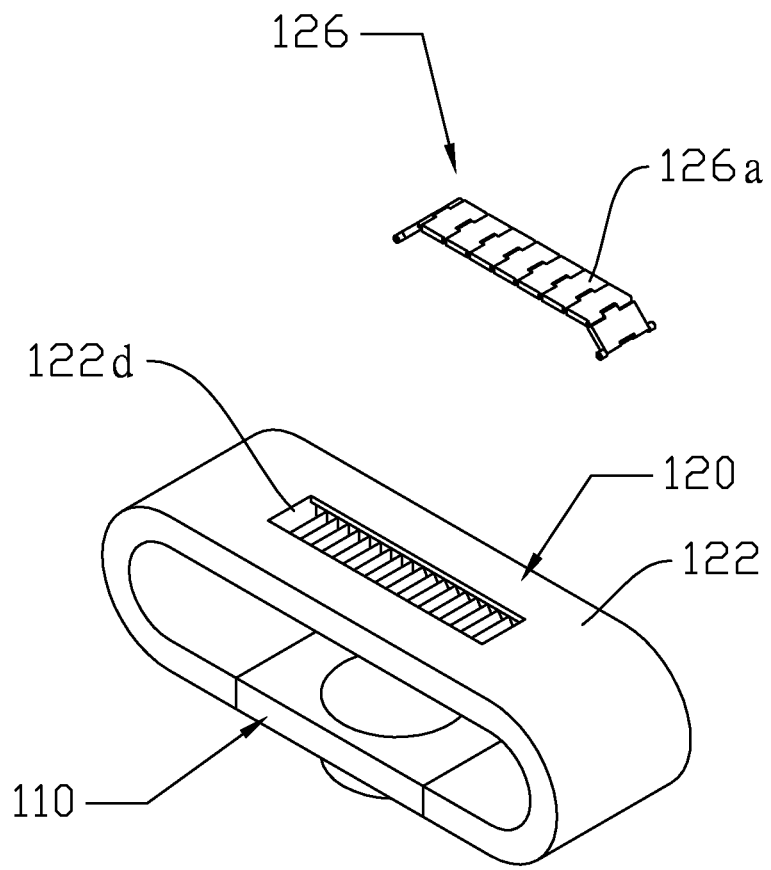
FIG. 9 is an exploded view illustrating the holder according to one embodiment of the present invention.

In other better embodiments, the supporting element 126' of the holder 100f can be composed of multiple connecting units 126a, these connecting units 126a are pivoted with each other to constitute a supporting chain (as shown in FIG. 9, FIG. 9 is an explosive view illustrating the holder according to one embodiment of the present invention), and a better supporting efficiency is provided.

As described in the embodiments of the invention, it is within the scope and spirit of the present invention as long as at least one of the first connecting portion of the first body and the second connecting portion of the second body is applied to connected with the portable electronic device by the combination of the first body and the second body, and the present invention does not have any limitation.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A portable electronic module having a holder, comprising:
   a portable electronic device, having a first surface, a second surface corresponding to the first surface, and a display unit disposed at the first surface, and a connecting unit disposed at the second surface;
   a holder, holding the portable electronic device, the holder comprises:
      a first body, having a first connecting portion and a first wearing portion, the first connecting portion has a first connecting surface and a third connecting surface; and
      a second body, suited to connect with the first body, the second body having a second connecting portion and a second wearing portion, the second connecting portion has a second connecting surface and a fourth connecting surface, the second connecting portion is suited to connect with the first connecting portion, a combination of the first connecting surface and the second connecting surface is suited to connect with the portable electronic device, and a wearing space is formed to wear for a user by a combination of the first wearing portion and the second wearing portion.

2. The holder as claimed in claim 1, wherein the first connecting portion and the second connecting portion are magnetism.

3. The holder as claimed in claim 1, wherein the first connecting surface, the second connecting surface, the third connecting surface and the fourth connecting surface are magnetism.

4. The holder as claimed in claim 1, wherein the first connecting surface is a top surface of the first connecting portion, the third connecting surface is corresponding to the first connecting surface, and is a bottom surface of the first connecting portion, the second connecting surface is a top surface of the second connecting portion, the fourth connecting surface is corresponding to the second connecting surface, and is a bottom surface of the second connecting portion, and the second connecting surface and the third connecting surface are coplanar.

5. The holder as claimed in claim 1, further comprises a wire-winding unit with a connecting wire, the first connecting portion has a first accommodating space, the second connecting portion has a second accommodating space, the third connecting surface has a first opening, the fourth connecting surface has a second opening, wherein the wire-winding unit is disposed in at least one of the first accommodating space and the second accommodating space, and the connecting wire of the wire-winding unit is connected to the other of the first accommodating space and the second accommodating space through the first opening or the second opening, when the first connecting portion is not connected with the second connecting portion, a portion of the connecting wire is exposed out of the first connecting portion and the second connecting portion.

6. The holder as claimed in claim 1, wherein the first wearing portion is extended from the bottom of the first connecting portion, the second wearing portion is extended from the bottom of second wearing portion, and the first wearing portion has a first through hole and a fifth connecting surface, the second wearing portion has a second through hole and a sixth connecting surface, when the first body and the second body is connected with each other, the fifth connecting surface is connected with the sixth connecting surface, the first through hole and the second through hole are intercommunicated with each other to form the wearing space.

7. The holder as claimed in claim 6, wherein the first wearing portion has a first outside surface, the second wearing portion has a second outside surface, the first outside surface and the fifth connecting surface are connected with each other, the second outside surface and the sixth connecting surface are connected with each other, and the first outside surface and the second outside surface are curved surfaces.

8. The holder as claimed in claim 7, wherein there are multiple first sections and second sections, the first sections are arranged in the first outside surface adjacent to the fifth connecting surface, the second sections are arranged in the second outside surface adjacent to the sixth connecting surface, when the first body and the second body are connected with each other, each first section and each second section corresponding to the first section are connected with each other.

9. The holder as claimed in claim 7, wherein there are multiple first protrusions and second protrusions, the first protrusions are arranged in the first outside surface, and the second protrusions are arranged in the second outside surface, when the first body and the second body are connected with each other, each first protrusion and each second protrusion corresponding to the first section are connected with each other.

10. The holder as claimed in claim 1, wherein the second body is connected to two sides of the first body, the first connecting portion is disposed on the outside surface of the first body, the first wearing portion is disposed on the inside surface of the first body, the second connecting portion is disposed on outside surface of the second body, the second wearing portion is disposed on the inside surface of the second body, and the portable electronic device is disposed in the first connecting portion, a ring-shaped opening region is surrounded by the first wearing portion and the second wearing portion to form the wearing space.

11. The holder as claimed in claim 10, wherein the first connecting portion has a connecting element, the connecting element is suited to connect with the portable electronic device, and the portable electronic device is rotated opposite to the first connecting portion.

12. The holder as claimed in claim 11, wherein there is a guiding slot disposed in a portion of outside surface of the second connecting portion that away the first connecting portion, and the second body further comprises a supporting element, two ends of the supporting element are connected to the guiding slot movably, when the two ends of the supporting element are connected to two ends of the guiding slot, the outside surface of the supporting element and the outside surface of the second connecting portion are coplanar, when at least one end of the supporting element is not connected to the end portion of the guiding slot, the outside surface of the supporting element is protruded out of the outside surface of the second connecting portion.

* * * * *